United States Patent
Laicer et al.

(10) Patent No.: US 10,128,496 B2
(45) Date of Patent: Nov. 13, 2018

(54) THREE-DIMENSIONAL, POROUS ANODE FOR USE IN LITHIUM-ION BATTERIES AND METHOD OF FABRICATION THEREOF

(71) Applicant: GINER, INC., Newton, MA (US)

(72) Inventors: Castro Laicer, Watertown, MA (US); Brian Rasimick, Boston, MA (US); Kate Harrison, Arlington, MA (US); Robert McDonald, Stow, MA (US)

(73) Assignee: GINER, INC., Newton, MA (US)

( * ) Notice: Subject to any disclaimer, the term of this patent is extended or adjusted under 35 U.S.C. 154(b) by 598 days.

(21) Appl. No.: 14/827,070

(22) Filed: Aug. 14, 2015

(65) Prior Publication Data

US 2016/0049656 A1 Feb. 18, 2016

Related U.S. Application Data

(60) Provisional application No. 62/037,307, filed on Aug. 14, 2014.

(51) Int. Cl.
*H01M 4/13* (2010.01)
*H01M 4/36* (2006.01)
(Continued)

(52) U.S. Cl.
CPC ......... *H01M 4/366* (2013.01); *H01M 4/0416* (2013.01); *H01M 4/0471* (2013.01); *H01M 4/134* (2013.01); *H01M 4/1395* (2013.01); *H01M 4/364* (2013.01); *H01M 4/386* (2013.01); *H01M 4/625* (2013.01); *H01M 4/622* (2013.01); *H01M 4/661* (2013.01); *H01M 4/663* (2013.01); *H01M 10/052* (2013.01); *H01M 2004/027* (2013.01)

(58) Field of Classification Search
CPC .... H01M 4/366; H01M 4/0416; H01M 4/625; H01M 4/0471; H01M 4/134; H01M 4/1395; H01M 4/364; H01M 4/386; H01M 4/661; H01M 4/663; H01M 10/052; H01M 4/622; H01M 2004/027
USPC ........................................................ 429/213
See application file for complete search history.

(56) References Cited

U.S. PATENT DOCUMENTS 7,402,829 B2 7/2008 Green
7,618,678 B2 11/2009 Mao et al.
(Continued)

OTHER PUBLICATIONS

Poizot et al., "Searching for new anode materials for the Li-ion technology: time to deviate from the usual path," Journal of Power Sources, 97-98:235-239 (2001).
(Continued)

*Primary Examiner* — Gary D Harris
(74) *Attorney, Agent, or Firm* — Kriegsman & Kriegsman

(57) ABSTRACT

A three-dimensional, porous anode material suitable for use in a lithium-ion cell. The three-dimensional, porous anode material includes active anode particles embedded within a carbon matrix. The porous structure of this novel anode material allows for the expansion and contraction of the anode without the anode delaminating or breaking apart, thus improving the life-cycle of the lithium-ion cell. An example of this three-dimensional porous anode material is a porous silicon-carbon composite formed using a bi-continuous micro-emulsion (BME) template.

29 Claims, 11 Drawing Sheets

(51) Int. Cl.
   H01M 4/04     (2006.01)
   H01M 4/134    (2010.01)
   H01M 4/1395   (2010.01)
   H01M 4/38     (2006.01)
   H01M 4/62     (2006.01)
   H01M 4/02     (2006.01)
   H01M 4/66     (2006.01)
   H01M 10/052   (2010.01)

(56) References Cited

U.S. PATENT DOCUMENTS

| | | |
|---|---|---|
| 7,785,661 B2 | 8/2010 | Carel et al. |
| 8,101,298 B2 | 1/2012 | Green et al. |
| 8,263,265 B2 | 9/2012 | Mah et al. |
| 8,968,820 B2 * | 3/2015 | Zhamu .................. B82Y 30/00 427/58 |
| 2009/0068553 A1 | 3/2009 | Firsich |
| 2009/0117466 A1 * | 5/2009 | Zhamu .................. H01M 4/02 429/231.8 |
| 2010/0062338 A1 | 3/2010 | Golightly et al. |
| 2011/0143019 A1 | 6/2011 | Mosso et al. |
| 2011/0159365 A1 | 6/2011 | Loveness et al. |
| 2011/0250498 A1 | 10/2011 | Green et al. |
| 2012/0183856 A1 | 7/2012 | Cui et al. |
| 2012/0258361 A1 | 10/2012 | Joo et al. |
| 2013/0011736 A1 | 1/2013 | Loveness et al. |

OTHER PUBLICATIONS

Kasavajjula et al., "Nano- and bulk-silicon-based insertion anodes for lithium-ion secondary cells," Journal of Power Sources, 163(2):1003-1039 (2007).

Huggins, "Lithium alloy negative electrodes," Journal of Power Sources, 81-82:13-19 (1999).

Wang et al., "Lithium Insertion in Carbon-Silicon Composite Materials Produced by Mechanical Milling," Journal of the Electrochemical Society, 145(8):2751-2758 (1998).

Kim et al., "The Insertion Mechanism of Lithium into Mg2Si Anode Material for Li-Ion Batteries," Journal of the Electrochemical Society, 146(12):4401-4405 (1999).

Wang et al., "Innovative nanosize lithium storage alloys with silica as active centre," Journal of Power Sources, 88:278-281 (2000).

Cui et al., "Crystalline-Amorphous Core-Shell Silicon Nanowires for High Capacity and High Current Battery Electrodes," Nano Letters, 9(1):491-495 (2009).

Magasinski et al., "High-performance lithium-ion anodes using a hierarchical bottom-up approach," Nature Materials, 9(4):353-358 (2010).

Chan et al., "High-Performance lithium battery anodes using silicon nanowires," nature nanotechnology, 3:31-35 (2008).

* cited by examiner

THREE-DIMENSIONAL, POROUS ANODE FOR USE IN LITHIUM-ION BATTERIES AND METHOD OF FABRICATION THEREOF

CROSS-REFERENCE TO RELATED APPLICATIONS

The present application claims the benefit under 35 U.S.C. 119(e) of U.S. Provisional Patent Application No. 62/037,307, inventors Castro Laicer et al., filed Aug. 14, 2014, the disclosure of which is incorporated herein by reference.

FEDERALLY SPONSORED RESEARCH OR DEVELOPMENT

This invention was made with government support under NASA SBIR Phase I Grant No. NNX12CD89P entitled "A Three-Dimensional Nanoporous Silicon Anode for High-Energy Density Lithium-Ion Batteries" awarded by the United States National Aeronautics and Space Administration (NASA). The government has certain rights in the invention.

BACKGROUND OF THE INVENTION

Lithium-ion batteries are used in many commercial applications, such as aerospace, automotive, medical devices, and portable electronics, because of their desirable volumetric and gravimetric energy density performance compared to other rechargeable battery systems. However, further advancements in cell components are needed to address the increasing demands for lithium-ion batteries with higher energy density for several of these technologically important applications. One approach for improving the energy density of lithium-ion batteries involves replacing state-of-the-art electrodes with new electrode materials that offer enhanced energy density performance. Silicon (Si) is one candidate material that is promising as a potential next-generation anode because of its high theoretical capacity (4200 mAh/g) compared to state-of-the-art graphite carbon (327 mAh/g) (see, for example, Poizot et al. 2001, "Searching for New Anode Materials for the Li-Ion Technology: Time to Deviate from the Usual Path," *Journal of Power Sources*, 97-98, 235-239 (2001); and Kasavajjula et al. 2007, Nano- and Bulk-Silicon-Based Insertion Anodes for Lithium-Ion Secondary Cells," *Journal of Power Sources*, 163(2), 1003-1039 (2007), both incorporated herein by reference). The high specific capacity of Si materials significantly reduces the amount of active anode material required in the electrode, thus increasing the energy density of the battery cell. However, Si anodes have poor cycle life due to large volume changes (>300%) experienced during lithium insertion and extraction, which leads to fracturing and electrical isolation of the active anode particles, thus limiting their use in practical commercial lithium-ion battery applications (see, for example, Huggins 1999, "Lithium Alloy Negative Electrodes," *Journal of Power Sources*, 81-82, 13-19 (1999), incorporated herein by reference).

Various approaches described in the literature for improving the cycle life of Si anodes include nanowires grown on conductive substrates, silicon nanoparticles, silicon-carbon (Si—C) composites, and Si in active and inactive matrices (see, for example, U.S. Patent Application Publication No. 2011/0143019 A1, inventors Mosso et al., published Jun. 16, 2011; U. S. Patent Application Publication No. 2012/0183856 A1, inventors Cui et al., published Jul. 19, 2012; U.S. Patent Application Publication No. 2010/0062338 A1, inventors Golightly et al., published Mar. 11, 2010; Wang et al. 1998, "Lithium Insertion in Carbon-Silicon Composite Materials Produced by Mechanical Milling," *Journal of The Electrochemical Society*, 145(8), 2751-2758 (1998); U.S. Pat. No. 7,618,678 B2, inventors Mao et al., issued Nov. 17, 2009; U.S. Pat. No. 7,785,661, inventors Carel et al., issued Aug. 31, 2010; Kim et al. 1999, "The Insertion Mechanism of Lithium into Mg2Si Anode Material for Li-Ion Batteries," *Journal of The Electrochemical Society*, 146(12), 4401-4405 (1999); Wang et al. 2000, "Innovative Nanosize Lithium Storage Alloys with Silica as Active Centre," *Journal of Power Sources*, 88(2), 278-281 (2000); and Chan et al. 2008, "High-Performance Lithium Battery Anodes Using Silicon Nanowires," *Nature Nanotechnology*, 3, 31-35 (2008), all incorporated herein by reference). The small nanowires and nanoparticles are designed to reduce stress in the active Si material during extreme volume changes and also allow fast transport of Li-ions during cycling (see, for example, Cui et al. 2008, "Crystalline-Amorphous Core-Shell Silicon Nanowires for High Capacity and High Current Battery Electrodes," *Nano Letters*, 9(1), 491-495 (2008), incorporated herein by reference). Si—C composites consist of Si particles embedded in a carbon matrix that maintains electrical contact and provides mechanical support for the active Si particles during cycling.

Other examples of silicon anode preparations include: (1) fabrication of submicron Si pillars on Si wafer substrates using lithography-based methods wherein the formed Si pillars can be used as anode materials while attached on the Si substrate or as free wires after release from the substrate by mechanical methods (sonication or scraping) or chemical etching with hydrofluoric acid, (2) fabrication of Si anodes by coating Si active material onto pre-formed nanostructured, conductive substrates, such as metal silicide nanowires, carbon particles, and carbon nanofibers, (3) formation of porous Si anodes by chemical etching (e.g., acid or plasma gas) of Si powders (see, for example, U.S. Patent Application Publication No. 2009/0068553 A1, inventor Firsich, published Mar. 12, 2009; U.S. Pat. No. 8,101,298 B2, inventors Green et al., issued Jan. 24, 2012; U.S. Patent Application Publication No. 2013/0011736 A1, inventors Loveness et al., published Jan. 10, 2013; and Magasinski et al. 2010, "High-Performance Lithium-Ion Anodes Using a Hierarchical Bottom-Up Approach," *Nature Materials*, 9(4), 353-358 (2010), all incorporated herein by reference). The porous Si material may be further processed by coating with a passivating layer, such as carbon or gold (see, for example, U.S. Pat. No. 8,263,265 B2, inventors Mah et al., issued Sep. 11, 2012, incorporated herein by reference). These approaches, however, have yielded limited success in terms of realizing Si anode materials with improved cycle life. Additionally, the described synthesis methods have low production rates, high cost, and in some cases provide poor control over the resulting Si anode structure, which limits their use in practical commercial lithium-ion battery applications (see, for example, Magasinski et al. 2010, "High-Performance Lithium-Ion Anodes Using a Hierarchical Bottom-Up Approach," *Nature Materials*, 9(4), 353-358 (2010), incorporated herein by reference). These existing challenges indicate that further improvements are needed to realize Si anode materials with enhanced cycle life.

SUMMARY OF THE INVENTION

It is an object of the present invention to provide a new anode.

According to one aspect of the invention, the anode may comprise an anode coating layer and a substrate. According to a further feature of the aforementioned anode, the anode coating layer may have a thickness in the range of about 10 to 1000 µm, preferably about 10 to 100 µm, and may be coated onto one or both sides of the substrate. According to a further feature of the aforementioned anode, the anode coating layer may have a porosity range of about 40-70% by volume.

According to another feature of the aforementioned anode, the substrate may comprise a copper foil. According to another feature of the aforementioned anode, substrate may comprise a copper alloy, aluminum, stainless steel, titanium, nickel, nickel alloy, chromium, tungsten, metal nitrides, metal carbides, metal oxides, carbon, carbon fiber, graphite, graphene, conductive polymers, or a combination thereof. According to another feature of the aforementioned anode, substrate may comprise a film, mesh, perforated sheet, foam, wires, laminates, tubes, particles, or multi-layer structures. According to a further feature of the aforementioned anode, the substrate may have a thickness range of about 1 to 50 µm.

According to another feature of the aforementioned anode, the anode coating layer may comprise a porous anode material, a conductive additive, and a binder. According to a further feature of the aforementioned anode, the range of weight percentages for each component within the anode coating layer may be about 20-92% by weight of porous anode material, about 0.1-70% by weight of conductive additive, and about 2-25%, preferably about 2-10%, by weight of binder.

According to another feature of the aforementioned anode, the porous anode material may comprise an interconnected network of pores wherein the interconnected network of pores is substantially continuous in all three dimensions.

According to another feature of the aforementioned anode, the porous anode material may comprise a composite of active anode particles embedded in a carbon matrix.

According to another feature of the aforementioned anode, the carbon matrix may comprise amorphous or crystalline carbon.

According to another feature of the aforementioned anode, the active anode particles may comprise carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide. According to a further feature of the aforementioned anode, the active anode particles may have a range of about 1-90% by weight, preferably about 40% or higher by weight (of the anode coating layer total weight). According to a further feature of the aforementioned anode, the active anode particles may comprise a range of particle sizes of about 0.005 to 30 µm, preferably about 0.005 to 0.5 µm.

According to another feature of the aforementioned anode, the conductive additive may comprise carbon black, acetylene black, natural and synthetic graphite, coke, Ketchen black, channel black, furnace black, lamp black, carbon fiber, graphene sheets, carbon nanotubes (single-, double-, and multi-walled-nanotubes), metallic particles (e.g. particles of copper, stainless steel, nickel, or other inert metals), conductive metal oxides, electronically conductive polymers, or a combination of thereof. According to a further feature of the aforementioned anode, the conductive additive may comprise spheres, rods, ellipsoids, bead-like strings, plates, sheets, or branched structures. According to a further feature of the aforementioned anode, the conductive additive may have length, width, height, thickness, and diameter ranges of about 0.001 to 30 µm.

According to another feature of the aforementioned anode, the binder may comprise aqueous or non-aqueous binders. According to a further feature of the aforementioned anode, the binder may comprise aqueous binders carboxymethyl cellulose ("CMC"), CMC in combination with styrene-butadiene copolymer (SBR), -poly(acrylic acid) (PAA), acrylonitrile-butadiene copolymer latex, polyacrylamide in combination with carboxylated styrene-butadiene copolymer, polyacrylamide in combination with carboxylated styrene-acrylate copolymer, or a combination of thereof. According to a further feature of the aforementioned anode, the binder may comprise non-aqueous binders fluorinated polymers and their copolymers, such as poly(tetrafluoroethylene) (PTFE), poly(vinylidene fluoride) (PVDF), and poly (vinylidene fluoride-co-hexafluoropropylene). Other examples of non-aqueous binders may include, but are not limited to, styrene-butadiene copolymer (SBR), acrylonitrile-butadiene copolymer (NBR), carboxymethyl cellulose (CMC), polyacrylic, polyethylene oxide, polyimide, poly (vinyl pyrrolidone) (PVP), or a combination thereof. According to a further feature of the aforementioned anode, the binder may comprise polyurethanes or polyamides.

It is another object of the present invention to provide a lithium-ion cell comprising an anode, a cathode, and a separator wherein the anode comprises a porous anode coating layer and a substrate. According to a further feature of the aforementioned anode, the anode coating layer may have a thickness range of about 10 to 1000 µm, preferably about 10 to 100 µm, and may be coated onto one or both sides of the substrate. According to a further feature of the aforementioned anode, the anode coating layer may have a porosity range of about 40-70% by volume.

According to another feature of the aforementioned lithium-ion cell, the substrate may comprise a copper foil. According to another feature of the aforementioned anode, substrate may comprise a copper alloy, aluminum, stainless steel, titanium, nickel, nickel alloy, chromium, tungsten, metal nitrides, metal carbides, metal oxides, carbon, carbon fiber, graphite, graphene, conductive polymers, or a combination thereof. According to another feature of the aforementioned anode, substrate may comprise a film, mesh, perforated sheet, foam, wires, laminates, tubes, particles, or multi-layer structures. According to a further feature of the aforementioned anode, the substrate may have a thickness range of about 1 to 50 µm.

According to another feature of the aforementioned lithium-ion cell, the anode coating layer may comprise a porous anode material, a conductive additive, and a binder. According to a further feature of the aforementioned anode, the range of weight percentages for each component within the anode coating layer may be about 20-92% by weight of porous anode material, about 0.1-70% by weight of conductive additive, and about 2-25%, preferably about 2-10%, by weight of binder.

According to another feature of the aforementioned anode, the porous anode material may comprise an interconnected network of pores wherein the interconnected network of pores is substantially continuous in all three dimensions.

According to another feature of the aforementioned lithium-ion cell, the porous anode material may comprise a composite of active anode particles embedded in a carbon matrix.

According to another feature of the aforementioned lithium-ion cell, the carbon matrix may comprise amorphous or crystalline carbon.

According to another feature of the aforementioned lithium-ion cell, the active anode particles may comprise carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide. According to a further feature of the aforementioned anode, the active anode particles may have a range of about 1-90% by weight, preferably about 40% or higher by weight (of the anode coating layer total weight). According to a further feature of the aforementioned anode, the active anode particles may comprise a range of particle sizes of about 0.005 to 30 μm, preferably about 0.005 to 0.5 μm.

According to another feature of the aforementioned lithium-ion cell, the conductive additive may comprise carbon black, acetylene black, natural and synthetic graphite, coke, Ketchen black, channel black, furnace black, lamp black, carbon fiber, graphene sheets, carbon nanotubes (single-, double-, and multi-walled-nanotubes), metallic particles (e.g. particles of copper, stainless steel, nickel, or other inert metals), conductive metal oxides, electronically conductive polymers, or a combination of thereof. According to a further feature of the aforementioned anode, the conductive additive may comprise spheres, rods, ellipsoids, bead-like strings, plates, sheets, or branched structures. According to a further feature of the aforementioned anode, the conductive additive may have length, width, height, thickness, and diameter ranges of about 0.001 to 30 μm.

According to another feature of the aforementioned lithium-ion cell, the binder may comprise aqueous or non-aqueous binders. According to a further feature of the aforementioned anode, the binder may comprise aqueous binders carboxymethyl cellulose ("CMC"), CMC in combination with styrene-butadiene copolymer (SBR), -poly (acrylic acid) (PAA), acrylonitrile-butadiene copolymer latex, polyacrylamide in combination with carboxylated styrene-butadiene copolymer, polyacrylamide in combination with carboxylated styrene-acrylate copolymer, or a combination of thereof. According to a further feature of the aforementioned anode, the binder may comprise non-aqueous binders fluorinated polymers and their copolymers, such as poly(tetrafluoroethylene) (PTFE), poly(vinylidene fluoride) (PVDF), and poly(vinylidene fluoride-co-hexafluoropropylene). Other examples of non-aqueous binders may include, but are not limited to, styrene-butadiene copolymer (SBR), acrylonitrile-butadiene copolymer (NBR), carboxymethyl cellulose (CMC), polyacrylic, polyethylene oxide, polyimide, poly(vinyl pyrrolidone) (PVP), or a combination thereof. According to a further feature of the aforementioned anode, the binder may comprise polyurethanes or polyamides.

It is another object of the present invention to provide a method for fabricating a porous anode material comprising the steps of forming a bi-continuous micro-emulsion (BME), removing one polymer in the solid BME to form a porous BME template, impregnating the BME template the anode material precursor, and pyrolyzing the impregnated BME to form the porous anode material.

According to another feature of the aforementioned method, the forming of a BME step may comprise blending the three polymers in a solvent wherein the three polymers comprise polymer A, polymer B, and di-block polymer A-B.

According to another feature of the aforementioned method, polymer A and polymer B may be immiscible and may have comparable molar volumes. According to another feature of the aforementioned method, di-block polymer A-B may have a molar volume comparable to polymer A and polymer B.

According to another feature of the aforementioned method, polymer A or polymer B may comprise polyisoprene (PI), polystyrene (PS), polyethylene (PE), poly(ethylene-alt-propylene) (PEP), poly(ethylene oxide) (PEO), polypropylene (PP), polyethylethylene (PEE), poly(dimethylsiloxane) (PDMS), poly(methylmethacrylate) (PMMA), poly(L-lactide) (PLLA).

According to another feature of the aforementioned method, di-block polymer A-B may comprise polystyrene-block-polyisoprene (PS-PI), poly(ethylene-block-ethylene-alt-propylene) (PE-PEP), polyethylethylene-block-poly(dimethylsiloxane) (PEE-PDMS), polyethylene-block-poly (ethylene oxide) (PE-PEO), polystyrene-block-poly (methylmethacrylate) (PS-PMMA), polystyrene-block-poly (ethylene oxide) (PS-PEO), or polystyrene-block-poly(L-lactide) (PS-PLLA).

According to another feature of the aforementioned method, the composition of the ternary polymer composite may comprise about 45% polymer A by volume, about 45% polymer B by volume, and about 10% di-block polymer A-B by volume.

According to another feature of the aforementioned method, the forming of a BME step may comprise a solvent suitable for dissolving all three polymers. According to a further feature of the aforementioned method, the solvent may comprise benzene, tetrahydrofuran, hexane, xylene, chloroform, methylene chloride, water, toluene, cyclohexane, ether, N-2-methyl pyrolidone, or dimethyl sulfoxide.

According to another feature of the aforementioned method, the removing of polymer A or polymer B step may comprise selectively removing polymer A or polymer B with a solvent wherein dissolves only one of polymer A or polymer B. According to a further feature of the aforementioned method, the solvent may comprise benzene, tetrahydrofuran, hexane, xylene, chloroform, methylene chloride, water, toluene, N-2-methyl pyrolidone, dimethyl sulfoxide, cyclohexane, and ether.

According to another feature of the aforementioned method, the void volume left from the removal of polymer A or polymer B may comprise an interconnected network of pores wherein the interconnected network of pores is substantially continuous in all three dimensions.

According to another feature of the aforementioned method, solvent dissolution of polymer A or polymer may be facilitated by heating to a temperature lower than the solvent boiling point and lower than the melting and glass transition temperatures of the three polymers comprising the solid BME.

According to another feature of the aforementioned method, the removing of polymer A or polymer B step may comprise selectively removing polymer A or polymer B by reactive ion etching, chemical etching, depolymerization, and UV light etching.

According to another feature of the aforementioned method, the impregnating of the porous BME template step may comprise filling the BME pores with an anode precursor and a solvent. According to a further feature of the aforementioned method, the anode precursor may comprise active anode particles and a carbon-forming precursor.

According to another feature of the aforementioned method, the solvent may suspend the active anode particles and dissolve the carbon-forming precursor. According to further feature of the aforementioned method, the solvent may comprise toluene, benzene, tetrahydrofuran, xylene, quinoline, naphthalene, acetone, cyclohexane, ether, water, and N-2-methyl pyrrolidone.

According to another feature of the aforementioned method, the active anode particles may comprise carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide.

According to another feature of the aforementioned method, the carbon-forming precursor may comprise polyacrylonitrile, phenolic resins (e.g. resorcinol), carbohydrate materials, petroleum and coal tar pitches.

According to another feature of the aforementioned method, the pyrolyzing of the impregnated BME template step may comprise heating the impregnated BME template wherein the porous anode material may be formed, and polymer B and di-block polymer A-B may be removed from the impregnated BME template. According to a further feature of the aforementioned method, pyrolysis may occur at a temperature in the range of about 300-1500° C.

According to another feature of the aforementioned method, the void volume left from the removal of polymer A and di-block polymer A-B may comprise an interconnected network of pores wherein the interconnected network of pores is substantially continuous in all three dimensions.

According to another feature of the aforementioned method, the porous anode material may comprise a composite of active anode particles embedded in a carbon matrix.

According to another feature of the aforementioned method, the carbon matrix may comprise amorphous or crystalline carbon.

According to another feature of the aforementioned method, the active anode particles may comprise carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide. According to a further feature of the aforementioned anode, the active anode particles may have a range of about 1-90% by weight, preferably about 40% or higher by weight (of the anode coating layer total weight). According to a further feature of the aforementioned anode, the active anode particles may comprise a range of particle sizes of about 0.005 to 30 μm, preferably about 0.005 to 0.5 μm.

It is another object of the present invention to provide a porous material suitable for use in an anode.

According to one aspect of the invention, a porous material suitable for use in an anode is provided, the porous material being prepared by a method comprising the steps of (a) forming a bi-continuous microemulsion, the bi-continuous microemulsion comprising a polymer A, a polymer B, and a di-block polymer A-B; (b) solidifying the bi-continuous microemulsion to form a solid bi-continuous microemulsion; (c) removing either, but not both, of the polymer A or the polymer B from the solid bi-continuous microemulsion, whereby a porous template is produced; (d) impregnating the porous template with a mixture comprising active anode particles and a carbon-forming precursor; (e) treating the impregnated porous template so that the carbon-forming precursor is converted to a carbon matrix, whereby the active anode particles are embedded in the carbon matrix, and so that the polymer B and the di-block polymer A-B are eliminated, leaving voids where the polymer B and the di-block polymer A-B were previously, the voids creating an interconnected network of pores that is substantially continuous in all three dimensions.

It is another object of the invention to provide a novel anode coating.

According to one aspect of the invention, an anode coating is provided, the anode coating comprising (a) the porous material described above; and (b) a binder.

It is another object of the invention to provide a novel anode.

According to one aspect of the invention, an anode is provided, the anode comprising (a) the anode coating described above; and (b) a substrate, the anode coating being disposed on the substrate.

It is another object of the invention to provide a novel battery.

According to one aspect of the invention, a battery is provided, the battery comprising (a) the anode of claim 18; (b) a cathode; (c) a separator, the separator positioned between the anode and the cathode; and (d) an electrolyte.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF INVENTION

To provide improved cycle life of lithium-ion batteries, the present invention is directed, at least in part, to a three-dimensional, porous anode material with the capacity for higher energy density and greater mechanical rigidity, as the voids in the anode material provide for expansion and contraction of the without the anode material breaking apart or becoming delaminated.

Figure 1:
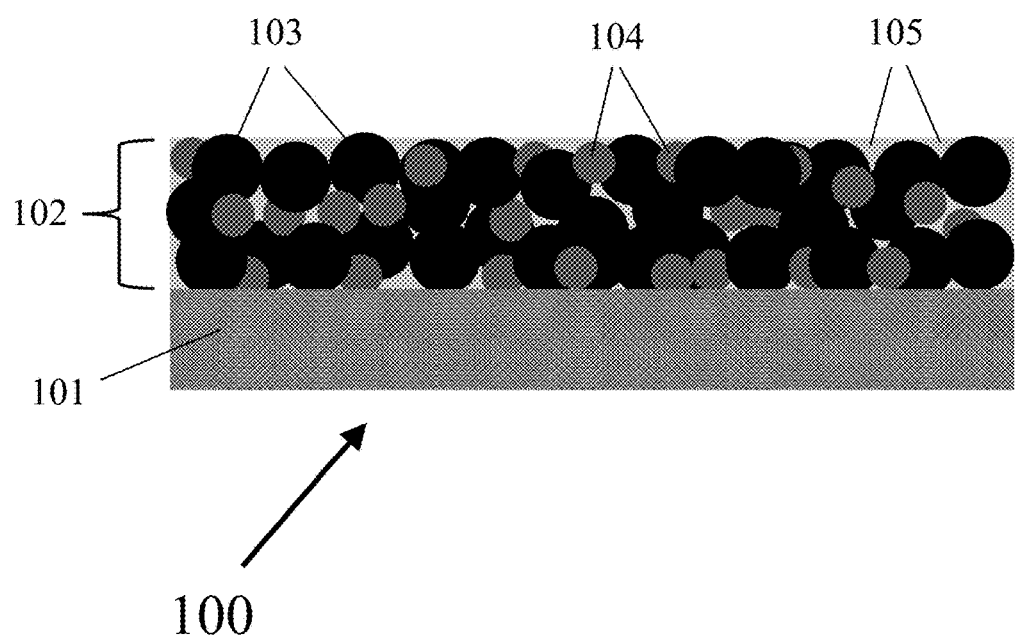
FIG. 1 is a schematic side view of one embodiment of an anode according to the teachings of the present invention.

Referring now to FIG. 1, there is schematically shown a side view of one embodiment of an anode constructed according to the present invention, the anode being represented generally by reference numeral 100.

Anode 100 may comprise a substrate 101 and an anode coating layer 102. Anode coating layer 102, in turn, may comprise a porous anode material 103, a conductive additive 104, and a binder 105. Anode coating layer 102 may have a thickness in the range of about 10 to 1000 µm, preferably about 10 to 100 µm, and may be coated onto one or both sides of substrate 101 using blade-casting, rod-casting, spraying, or other methods commonly used in roll-to-roll coating of battery electrodes (e.g., slot-die coating).

Porous anode material 103 may comprise a porous carbon composite material comprising active anode particles embedded within a carbon matrix. The porous structure of porous anode material 103 may allow for the expansion and contraction of anode coating layer 102 without having anode coating layer 102 delaminating or breaking apart. The pores within porous anode material 103 preferably form an interconnected network of pores, wherein the interconnected network of pores is substantially continuous in all three dimensions. The carbon matrix of porous anode material 103 may comprise amorphous or crystalline carbon. Examples of active anode particles include, but are not limited to, carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide. The active anode particles of porous anode material 103 may constitute about 1-90% by weight, preferably 40% or higher by weight, of the total weight of anode coating layer 102. The range of particles sizes for the active anode particles may be about 0.005 to 30 µm, preferably about 0.005 to 0.5 µm. The particle size range for the porous anode material may be about 0.01 to 100 µm, preferably range of about 1 to 10 µm.

Conductive additive 104 may be interspersed among porous anode material 103 within anode coating layer 102 to enhance electrical conductivity. Examples of materials suitable for use as conductive additive 104 may include, but are not limited to, carbon black, acetylene black, natural and synthetic graphite, coke, Ketchen black, channel black, furnace black, lamp black, carbon fiber, graphene sheets, carbon nanotubes (single-, double-, and multi-walled-nanotubes), metallic particles (e.g. particles of copper, stainless steel, nickel, or other inert metals), conductive metal oxides, electronically conductive polymers, or a combination of thereof. The materials used as conductive additive 104 may be spheres, rods, ellipsoids, bead-like strings, plates, sheets, branched structures with dimensions (length, width, height, and diameter) in the range of about 0.001 to 30 µm.

Binder 105 may function in anode coating layer 102 to promote greater adhesion among porous anode material 103 and conductive additive 104, as well as to promote greater adhesion of porous anode material 103 and conductive additive 104 to substrate 101. Material used as binder 105 may be soluble in aqueous or non-aqueous solvents. Examples of suitable aqueous binders may include, but are not limited to, carboxymethyl cellulose ("CMC"), CMC in combination with styrene-butadiene copolymer (SBR), -poly(acrylic acid) (PAA), acrylonitrile-butadiene copolymer latex, polyacrylamide in combination with carboxylated styrene-butadiene copolymer, polyacrylamide in combination with carboxylated styrene-acrylate copolymer, or a combination of thereof. Examples of suitable non-aqueous binders may include, but are not limited to, fluorinated polymers and their copolymers, such as poly(tetrafluoroethylene) (PTFE), poly(vinylidene fluoride) (PVDF), and poly(vinylidene fluoride-co-hexafluoropropylene). Other examples of suitable non-aqueous binders may include, but are not limited to, styrene-butadiene copolymer (SBR), acrylonitrile-butadiene copolymer (NBR), carboxymethyl cellulose (CMC), polyacrylic, polyethylene oxide, polyimide, poly(vinyl pyrrolidone) (PVP), or a combination thereof. Examples of binders that may be prepared with aqueous or non-aqueous solvents may include, but are not limited to, polyurethanes or polyamides.

The ranges of weight percentages for the components in anode coating layer 102 may be as follows: 20-92% by weight of porous anode material 103, 0.1-70% by weight of conductive additive 104, and 2-25%, preferably 2-10%, by weight of binder 105.

Substrate 101 may function to provide a rigid backing for anode coating layer 102, as well as to provide electrical conductivity to anode 100 (for an external circuit). Materials suitable for use as substrate 101 may comprise a metal foil, such as copper foil, but may also comprise a film, mesh, perforated sheet, foam, wires, laminates, tubes, particles, or multi-layer structures. Besides copper, substrate 101 may also comprise a copper alloy, aluminum, stainless steel, titanium, nickel, nickel alloy, chromium, tungsten, metal nitrides, metal carbides, metal oxides, carbon, carbon fiber, graphite, graphene, conductive polymers, or a combination thereof. A preferred thickness range for substrate 101 is about 1 to 50 μm.

Figure 2:
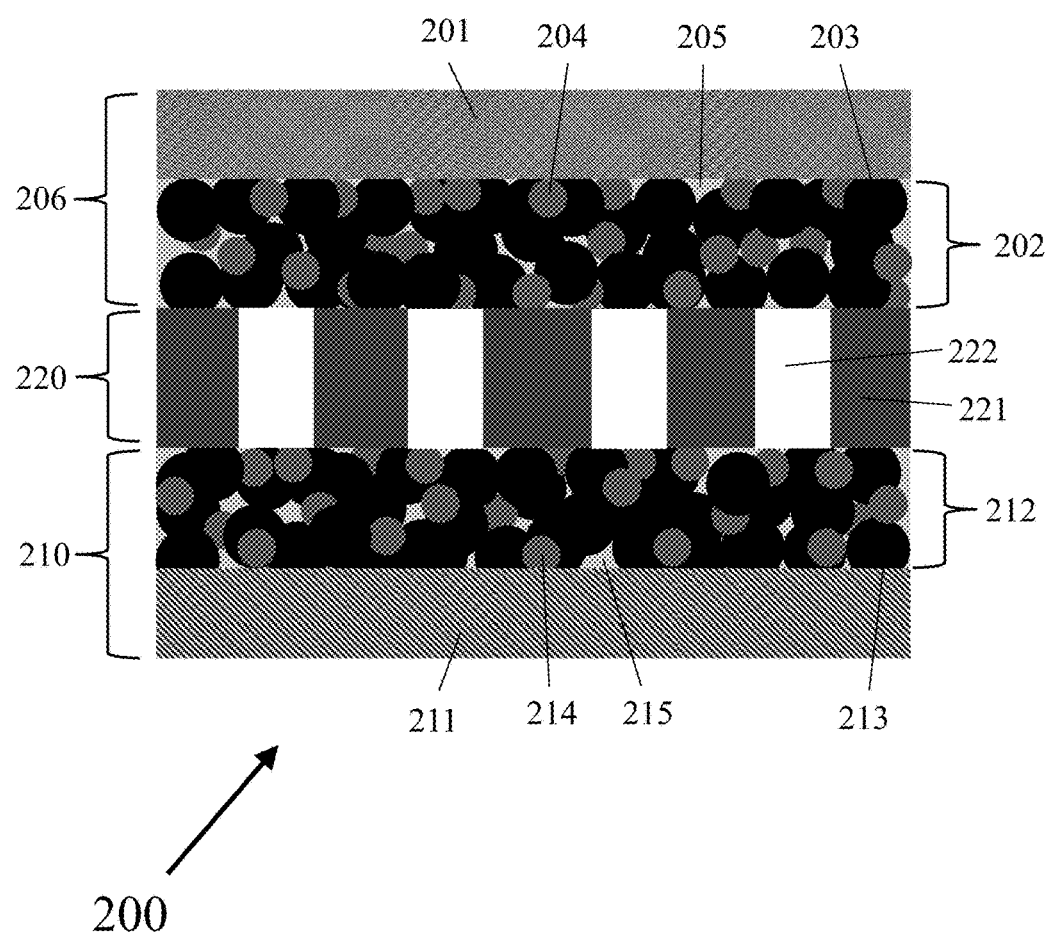
FIG. 2 is a schematic side view of one embodiment of a lithium-ion battery according to the teachings of the present invention.

Referring now to FIG. 2, there is schematically shown one embodiment of a lithium-ion battery constructed according to the teachings of the present invention, the lithium-ion battery being represented generally by reference numeral 200.

Lithium-ion battery 200 may comprise an anode 206, a cathode 210, and a separator 220. Anode 206 may comprise a substrate 201 and an anode coating layer 202. Substrate 201 may be identical or similar to substrate 101. Anode coating layer 202 may be identical or similar to anode coating layer 102 and may comprise a porous anode material 203, a conductive additive 204, and a binder 205. Porous anode material 203, conductive additive 204, and binder 205 may be identical or similar to porous anode material 103, conductive additive 104, and binder 105, respectively.

Cathode 210 may comprise a cathode coating 212 and a substrate 211. Substrate 211 may function to provide a rigid backing for cathode coating layer 212, as well as to provide electrical conductivity to cathode 210 (for an external circuit). Substrate 211 for cathode 210 may comprise aluminum foil, but may also comprise a substrate identical or similar to substrate 101. A preferred thickness range for substrate 211 is about 1 to 50 μm.

Cathode coating layer 212 may comprise a cathode material 213, which may comprise a standard cathode material for a lithium-ion battery. Materials suitable for use as cathode material 213 may include, but are not limited to, $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO_2$, $LiFe_2(SO_4)_3$, $LiFe_2(SO_4)_3$, high-voltage spinel, $LiNi_{0.5}Mn_{1.5}O_2$, carbon fluoride, metal fluoride, sulfur, or a combination thereof. Doped and non-stoichiometric variations of these porous cathode materials may also be used. Examples of dopant materials may include, but are not limited to, elements from Groups III and V of The Periodic Table of Elements, such as boron, aluminum, gallium, indium, thallium, phosphorous, antimony, and bismuth. Other dopant materials may include, but are not limited to, selenium and sulfur.

Cathode coating layer 212 may further comprise a conductive additive 214 and a binder 215. Conductive additive 214, which may be identical or similar to conductive additive 104, may be interspersed among cathode material 213 to enhance electrical conductivity. Binder 215, which may be identical or similar to binder 105, may function in cathode coating layer 212 to promote greater adhesion among cathode material 213 and conductive additive 214, as well as to promote greater adhesion of cathode material 213 and conductive additive 214 to substrate 211.

Anode coating layer 202 and cathode coating layer 212 may be adhered to opposing sides of separator 220. Separator 220 may be a porous or non-porous material that is electrically insulating and allows the transport of lithium ions between anode 206 and cathode 210. Examples of materials suitable for use as separator 220 may include, but are not limited, micro-porous polyethylene (PE) membranes, micro-porous polypropylene (PP) membranes, micro-porous trilayer membranes (e.g., PP/PE/PP), Celgard 2400, glass fibers, or PTFE. The thickness range for separator 220 may be about 12 to 40 μm.

Electrolyte may be imbibed within the pores or voids of separator 220 and may comprise a liquid, solid, or a gel. Examples of suitable liquid electrolytes may include, but are not limited to, cyclic and linear carbonate, such as ethylene carbonate (EC), diethyl carbonate (DEC), propylene carbonate (PC), fluoroethylene carbonate (FEC), butylene carbonate (BC), dimethyl carbonate (DMC), methyl ethyl carbonate (MEC), methyl propyl carbonate (MPC), dipropyl carbonate (DPC), methyl butyl carbonate (MBC), dibutyl carbonate (DBC), vinylethylene carbonate (VEC). Suitable liquid electrolytes may also include ethers, such as tetrahydrofuran (THF), 2-methyltetrahydrofuran, 1,4-dioxane, 1,2-dimethoxyethane (DME), 1,2-diethoxyethane, 1,2-dibutoxyethane, and methyl propionate. Suitable liquid electrolytes may also include esters, nitriles, lactones, amides, organic phosphates, sulfones, and any combinations of the above-mentioned materials. A suitable gel electrolyte may include a mixture of lithium-containing salt, polymer, and liquid solvent. In the case of a gel electrolyte, the liquid solvent may swell but may not dissolve the polymer matrix.

The liquid or gel electrolyte may contain a lithium-containing salt dissolved in a non-aqueous organic solvent or a polymer gel. Examples of suitable lithium salts may include, but are not limited to, $LiPF_6$, $LiClO_4$, $LiBF_4$, lithium bis(oxalato)borate (LiBOB), $LiN(CF_3SO_2)_2$, $LiN(C_2F_5SO_2)_2$, $LiAsF_6$, $LiC(CF_3SO_2)_3$, $LiCF_3SO_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, or a combination thereof. The total concentration of lithium salt in a liquid non-aqueous solvent may range from about 0.3-2.5M, preferably about 0.70-1.5M. The lower salt concentration may be limited by conductivity of the electrolyte solution, while the upper salt concentration may be dictated by lithium salt solubility and viscosity of the resulting electrolyte solution.

A suitable solid electrolyte may comprise a lithium-containing salt mixed (or dispersed) within a solid polymer matrix. Examples of suitable solid electrolytes may include, but are not limited to, polymer electrolytes, such as polyethylene oxide (PEO) and its copolymers, fluorine-containing polymers and copolymers (e.g., polytetrafluoroethylene (PTFE), poly(vinylidene fluoride) (PVDF), and poly(vinylidene fluoride-co-hexafluoropropylene) (PVDF-co-HFP), chlorinated polymers (e.g., polyvinylidene chloride) and their copolymers, polyacrylonitrile (PAN), acrylate polymers, and a combination of the above-mentioned materials. A solid electrolyte may also function as a separator.

According to another aspect of the invention, there is provided a method for fabricating a porous anode material, the method comprising the steps of forming a bi-continuous micro-emulsion (BME), removing one polymer in the solid BME to form a porous BME template, impregnating the BME template with an anode material precursor, and pyrolyzing the anode material precursor to form the porous anode material.

Figure 3:
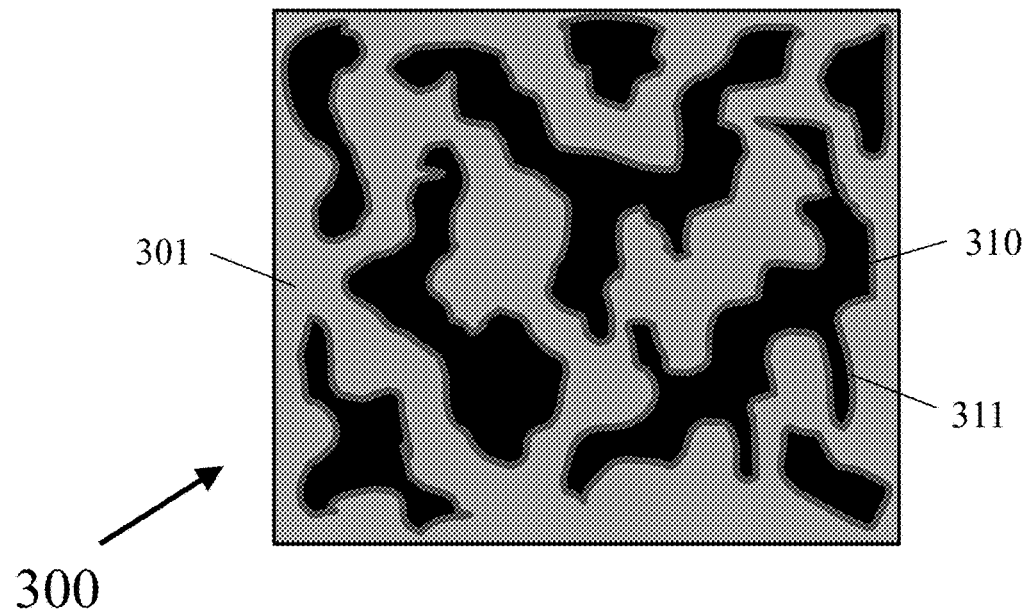
FIG. 3 is a top view of one embodiment of the solid bi-continuous micro-emulsion (BME) according to the teachings of the present invention.

During the first step of the aforementioned method for fabricating a porous anode material, three polymers may be blended in a solvent wherein the solvent may be removed to form the solid BME. Alternatively, the three polymers may be blended in a melt phase and then solidified to form the solid BME. Referring now to FIG. 3, BME 300 may comprise a polymer A 301, a polymer B 310, and a di-block polymer A-B 311. Polymer A and polymer B may be immiscible and may have comparable molar volumes. Di-block polymer A-B may have a molar volume comparable to polymer A and polymer B. Examples of materials suitable for use as polymers A and B may include, but are not limited to, polyisoprene (PI), polystyrene (PS), polyethylene (PE), poly(ethylene-alt-propylene) (PEP), poly(ethylene oxide) (PEO), polypropylene (PP), polyethylethylene (PEE), poly(dimethylsiloxane) (PDMS), poly(methylmethacrylate) (PMMA), poly(L-lactide) (PLLA). Examples of materials suitable for use as di-block polymer A-B may include, but are not limited to, polystyrene-block-polyisoprene (PS-PI), poly(ethylene-block-ethylene-alt-propylene) (PE-PEP), polyethylethylene-block-poly(dimethylsiloxane) (PEE-PDMS), polyethylene-block-poly(ethylene oxide) (PE-PEO), polystyrene-block-poly(methylmethacrylate) (PS-PMMA), polystyrene-block-poly(ethylene oxide) (PS-PEO), and polystyrene-block-poly(L-lactide) (PS-PLLA). Preferably, the composition of a ternary polymer composite may comprise 45% polymer A by volume, 45% polymer B by volume, and 10% di-block polymer A-B by volume.

When the three polymers are blended in a solvent, the solvent preferably is able to dissolve all three polymers. Examples of solvents suitable for use in dissolving the three polymers may include, but are not limited to, benzene, tetrahydrofuran, hexane, xylene, chloroform, methylene chloride, water, toluene, cyclohexane, ether, N-2-methyl pyrolidone, and dimethyl sulfoxide. Once the three polymers are blended in the solvent, the solvent may be removed by evaporation.

Figure 4:
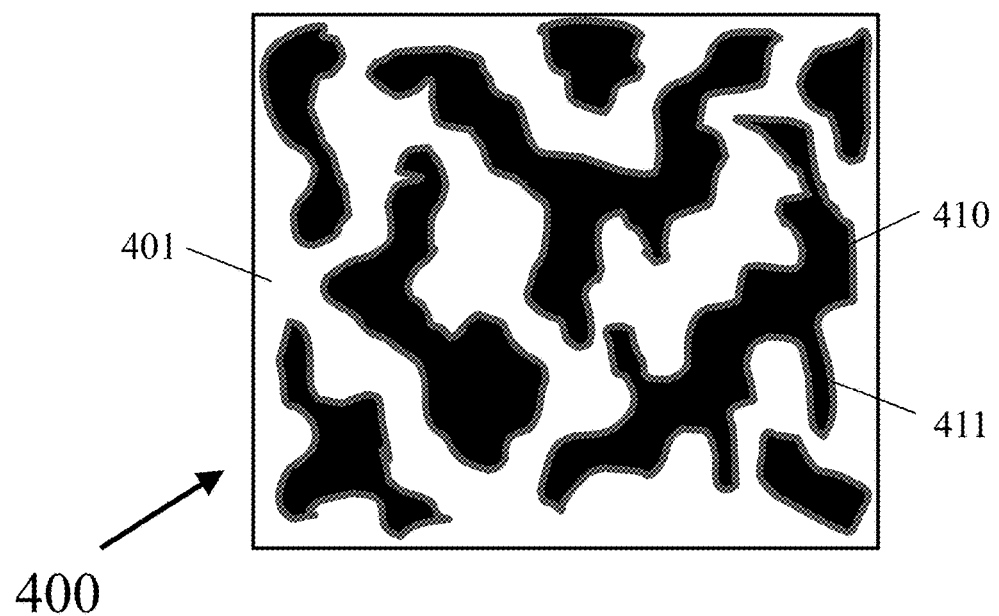
FIG. 4 is a top view of one embodiment of the porous BME template according to the teachings of the present invention.

During the second step of the above-noted method for fabricating a porous anode material, polymer A or polymer B may be removed from the BME by solvent dissolution to form a porous BME template. Referring now to FIG. 4, porous BME template may comprise a void volume 401, polymer B 410, and di-block polymer A-B 411. Polymer B 410 and di-block polymer 411 may be identical or similar to polymer B 310 and di-block polymer 311, respectively. In order to create void volume 401, a solvent may be used to selectively remove polymer A. In an alternative embodiment, a solvent may be used to selectively remove polymer B while polymer A may remain intact in the BME template. Examples of suitable solvents that may be used to selectively remove polymer A or polymer B may include, but are not limited to, benzene, tetrahydrofuran, hexane, xylene, chloroform, methylene chloride, water, toluene, N-2-methyl pyrolidone, dimethyl sulfoxide, cyclohexane, and ether. Solvent dissolution of polymer A or polymer B may be done at room temperature or by applying heat during solvent dissolution. The temperature range used to facilitate solvent dissolution should be lower than the solvent boiling point and lower than the melting and glass transition temperatures of the three polymers comprising the solid BME. Other methods for removing polymer A or polymer B may include, but are not limited to, reactive ion etching, chemical etching, depolymerization, and UV light etching. The void volume left by the removal of polymer A or polymer B may form an interconnected network of pores wherein the interconnected network of pores is substantially continuous in all three dimensions. The void volume may be approximately 45-55% by volume (of the total volume of the BME template).

Figure 5:
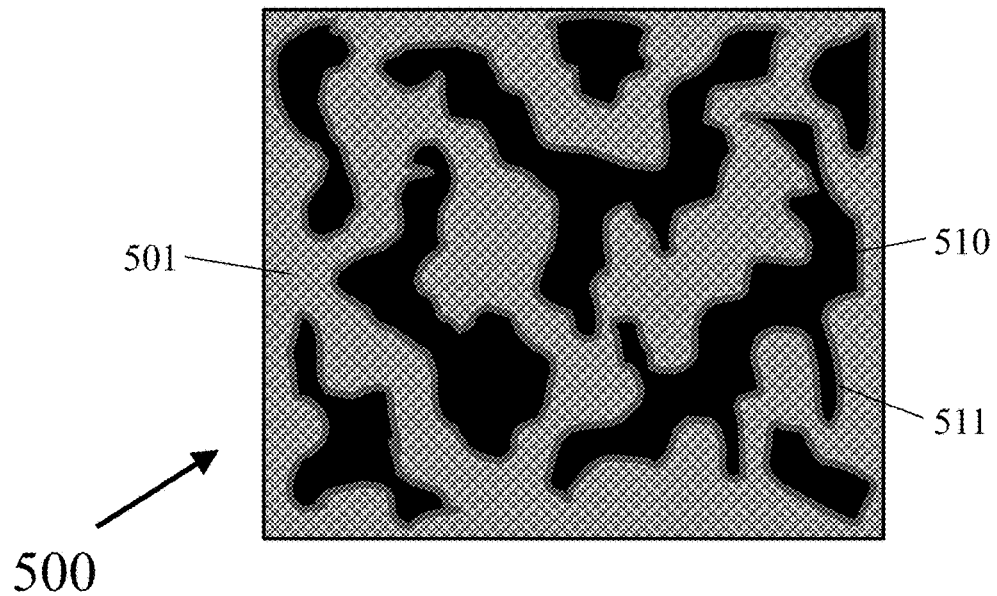
FIG. 5 is a top view of one embodiment of the impregnated BME template according to the teachings of the present invention.

During the third step of the above-mentioned method for fabricating a porous anode material, the porous BME template may be impregnated with an anode precursor. Referring now to FIG. 5, impregnated BME template 500 may comprise an anode precursor 501, a polymer B 510, and a di-block polymer A-B 511. Polymer B 510 and di-block polymer A-B 511 may be identical or similar to polymer B 310 and di-block polymer A-B 311, respectively. Anode precursor 510 may comprise a mixture of active anode particles and a carbon-forming precursor. Examples of the active anode particles may include, but are not limited to, carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide. The carbon-forming precursor preferably will polymerize or crosslink during this step to ensure that it stays solidified during the final pyrolysis step. Examples of materials suitable for use as the carbon-forming precursor may include, but are not limited to, polyacrylonitrile, phenolic resins (e.g. resorcinol), carbohydrate materials, petroleum and coal tar pitches.

A solvent that dissolves the carbon-forming precursor and suspends the active anode particles, while leaving polymer B and di-block polymer A-B intact, may be used to impregnate the void volume of the porous BME template. Examples of suitable solvents may include, but are not limited to, toluene, benzene, tetrahydrofuran, xylene, quinoline, naphthalene, acetone, cyclohexane, ether, water, and N-2-methyl pyrrolidone. Alternatively, the BME template may be impregnated with the anode precursor wherein the anode precursor may be melted and may diffuse into the void volume of the BME template.

Figure 6:
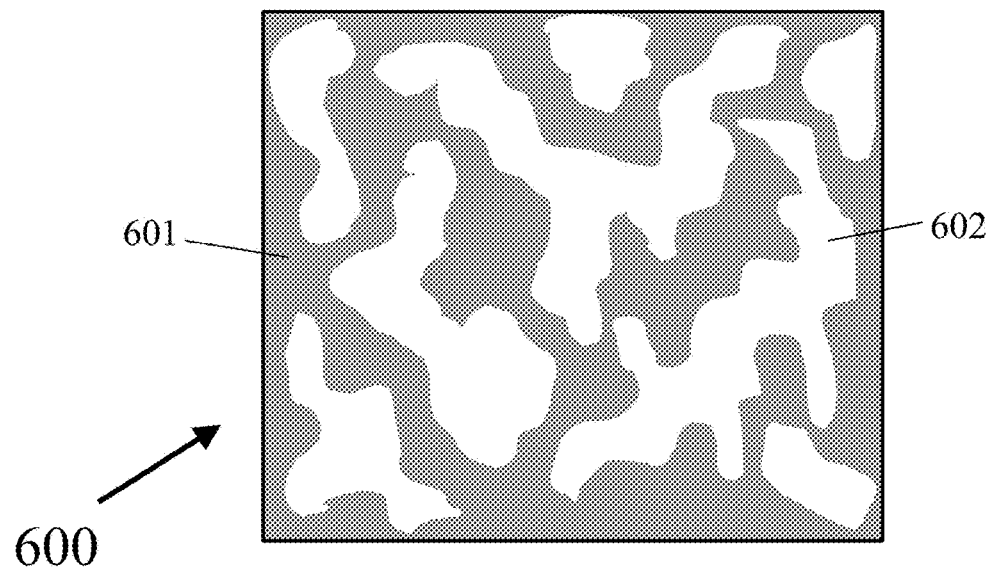
FIG. 6 is a top view of one embodiment of the porous anode material according to the teachings of the present invention.

During the final step of the above-mentioned method for fabricating a porous anode material, the impregnated BME template may be pyrolyzed wherein the porous anode material may be formed and polymer B and di-block polymer A-B may be removed from the impregnated BME template. Referring now to FIG. 6, there is shown a porous anode material 600. Porous anode material 600 may comprise an anode material 601 and a void volume 602. During pyrolysis, the impregnated BME template may be ramped to a temperature wherein the carbon-forming precursor may be converted to carbon, and polymer B and di-block polymer A-B may be removed from impregnated BME template. The range of temperatures used for pyrolysis may be about 300-1500° C. Porous anode material 600 formed after pyrolysis may be identical or similar to porous anode material 103. The void volume left from the removal of polymer B and di-block polymer A-B may form an interconnected network of pores wherein the interconnected network of pores is substantially continuous in all three dimensions. The range of porosity in the porous anode material may be about 40-70% by volume.

The following examples are provided for illustrative purposes only and are in no way intended to limit the scope of the present invention:

Example 1: Synthesizing Si—C without Using a Porous BME Template

The synthesis of Si—C was first investigated via the condensation polymerization of resorcinol and formaldehyde in aqueous solution containing dispersed Si nanoparticles (~25 nm in diameter). The synthesis was performed by combining resorcinol and formaldehyde in a 2:1 molar ratio and then diluting with water to form a 5-wt % solution. Si nanoparticles were then added and dispersed using sonication. An alkaline lithium carbonate catalyst was added and the solution was heated to 90° C., and then allowed to react at this temperature for 52 hours. The reaction mixture formed a gel 4 hours after catalyst addition. The gelled product was rinsed in acetone and vacuum-dried before being pyrolyzed under argon gas at 800° C. for 1 hr in a quartz tube furnace (at a heating rate of 10° C./min). Although this procedure produced a Si—C material with well-dispersed Si nanoparticles, the lithium carbonate catalyst used in the polymerization also catalyzed the oxidation of Si in the aqueous reaction media. A significant amount of hydrogen gas was evolved during the reaction, which is consistent with substantial oxidation of Si nanoparticles to $SiO_2$.

To inhibit Si oxidation, subsequent poly-condensation reactions of resorcinol and formaldehyde were done with hydrochloric acid (HCl) catalyst in acetonitrile solvent. This reaction was done by mixing resorcinol and formaldehyde in a 2.1:1 molar ratio, and then diluting with acetonitrile to form a 10% by weight solution. Si nanoparticles were added and the mixture was sonicated before adding the HCl catalyst. The mixture was placed in an oven and polymerized for 5 hours at 60° C. The reaction kinetics were accelerated in acidic reaction conditions with gelation of the reaction mixture occurring within 1 hour after catalyst addition. The resulting polymer gel was rinsed in acetone, vacuum-dried, and then pyrolyzed at 800° C. for 1 hour in a quartz tube furnace (at a heating rate of 10° C./min). As previously described, flowing argon was used to inhibit oxidation of Si nanoparticles. This method produced Si—C materials with aggregated Si particles that were encapsulated within carbon microcapsule particles. With further modifications that included significantly reducing the amount of HCl catalyst to 0.17 mM, aggregation of Si nanoparticles was minimized. Homogeneous dispersions of Si nanoparticles are critical to ensure good electronic contact with the carbon matrix during electrochemical operation. The composition of the Si—C product (53.7-wt % Si and 46.3-wt % carbon) was determined by thermogravimetric analysis (TGA).

Example 2: Synthesis of Si—C Anode Materials Using a Porous BME Template

Figure 7A:
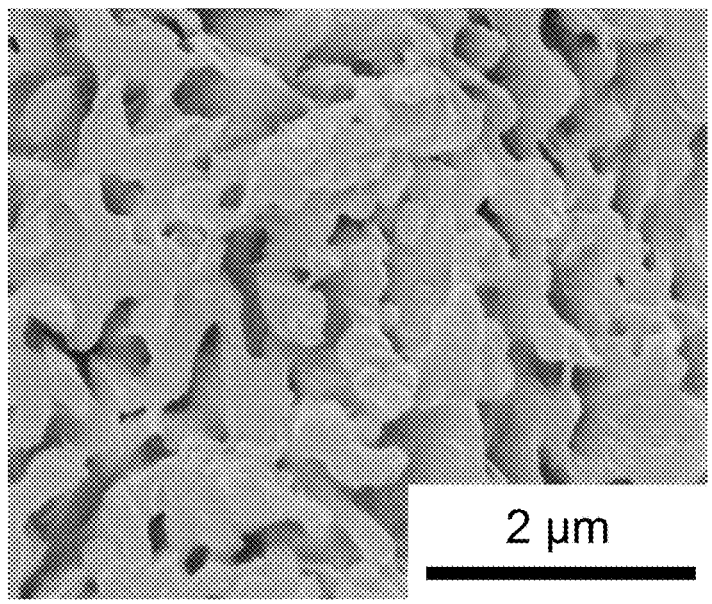
FIG. 7a is a magnified cross-sectional image, obtained with an SEM, of the porous BME PE/PE-PEP template according to the teachings of the present invention.

The three-dimensional, nanoporous silicon-carbon anode, also referred to as 3-D Si—C, was prepared using a porous BME polymer template. The nanoporous polymer scaffold was prepared by forming a blend of polyethylene (PE), poly(ethylene-alt-propylene) (PEP), and poly(ethylene-block-ethylene-ah-propylene) (PE-PEP), and then selectively removing the PEP phase with solvent extraction. The BME-precursor polymers symmetric PE-b-PEP diblock copolymer ($M_n$=101 kg/mol), PEP, and PE homopolymers ($M_n$=23 kg/mol), were dissolved in benzene at 75° C. to form a solution consisting of 45 vol % PE, 45 vol % PEP, and 10 vol % PE-b-PEP. The solution was rapidly cooled and freeze-dried to produce a solvent-free polymer blend. The blend was annealed at 129° C. for 2 hours, and then quenched in liquid nitrogen. The quench step ensures that there is no large-scale PE crystallization, which can disrupt the BME structure. The resulting BME material was soaked in THF to completely remove the PEP homopolymer from the BME (THF is a good solvent for PEP and a non-solvent for PE). The removal of PEP was confirmed by gravimetric measurements and SEM analysis, which showed successful preparation of a PE scaffold with bicontinuous, three-dimensional pore structures (FIG. 7a). Cross-sectional SEM analysis was done by freeze-fracturing the PE scaffolds that were first infiltrated with methanol, and then the samples were soaked in a liquid nitrogen bath for 10 min. The frozen methanol residing within the PE pores provided structural support to minimize sample deformation during cutting.

Figure 7B:
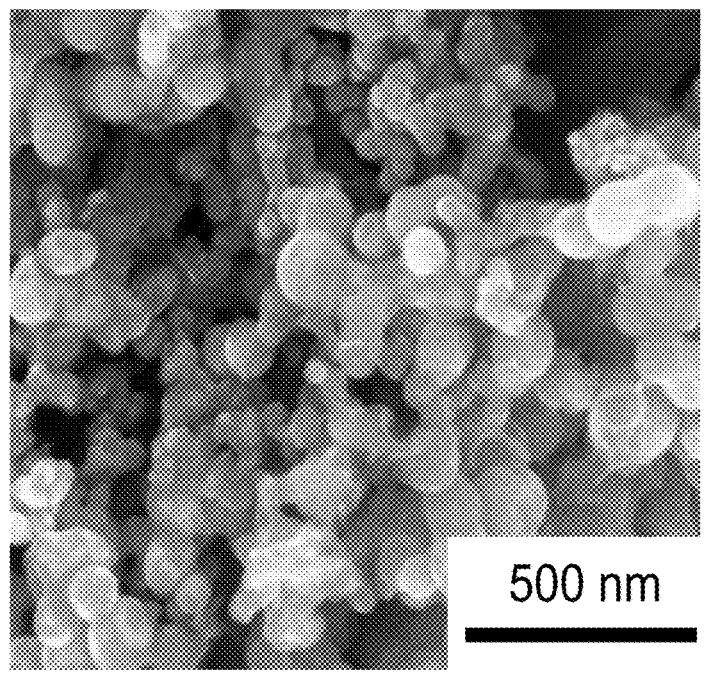
FIG. 7b is a magnified cross-sectional image, obtained with an SEM, of the porous BME PE/PE-PEP template according to the teachings of the present invention.

The resulting nano-porous PE scaffold was then used as a template for synthesizing the three-dimensional Si—C anode material. This was accomplished by infiltrating the PE scaffold with a precursor solution comprising a mixture of resorcinol, formaldehyde, Si nanoparticles, and HCl catalyst in acetonitrile. After completely filling the pores, the material was heated in an oven at 60° C. for 6 hours to induce thermal polymerization. The resulting composite was rinsed in acetone to remove trapped HCl, and then dried in a vacuum oven for 12 hours. Finally, the composite was pyrolyzed in a quartz tube furnace at 800° C. for 1 hour under flowing argon gas (at a heating rate of 10° C./min). Scanning electron microscopy analysis showed that the pyrolyzed product contains a three-dimensional pore structure (FIG. 7b). The composition of the three-dimensional Si—C anode material was determined to be 59.2% Si by weight and 40.8% carbon by weight from TGA.

Figure 8A:
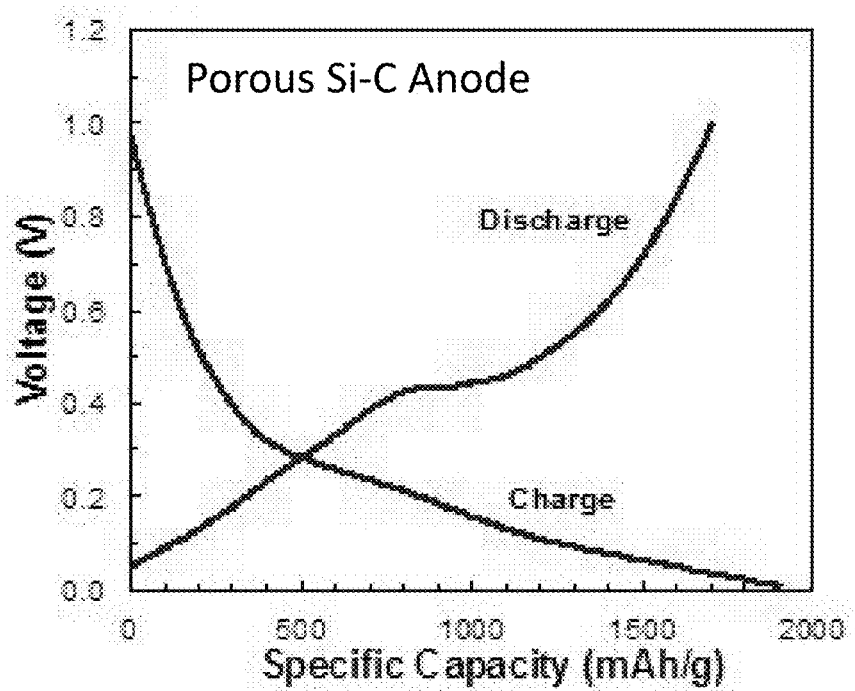
FIG. 8a is a graph of the voltage charge and discharge profiles using a lithium-ion cell with a porous Si—C anode according to the teachings of the present invention.
Figure 8B:
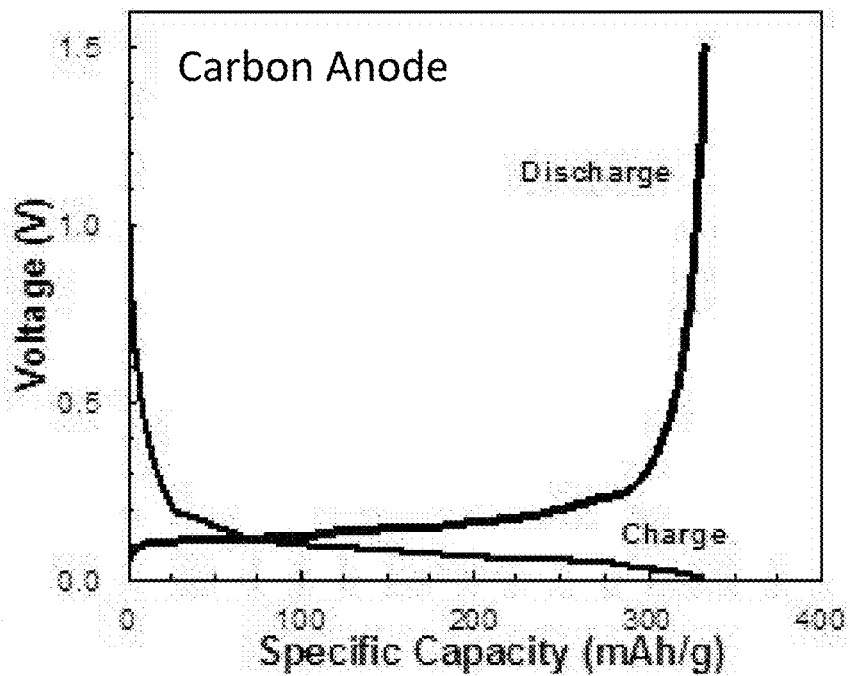
FIG. 8b is a graph of the voltage charge and discharge profiles using a lithium-ion cell with conventional carbon anode according to the teachings of the present invention.

Example 3: Electrochemical Evaluation and Performance of the Porous Si—C Anode Material Anode electrodes comprising the three-dimension, porous Si—C anode were prepared with a carboxymethyl cellulose/styrene-butadiene rubber binder (CMC/SBR, 1:1 weight ratio) and assembled into lithium-ion cells (CR2032-type coin cells) with a Celgard 2400 separator, lithium metal counter electrode, and electrolyte consisting of 1M $LiPF_6$ in 1/1/1 volume ratio of ethylene carbonate/diethyl carbonate/dimethyl carbonate and 1 wt % vinylene carbonate (VC) (1M $LiPF_6$ in 1/1/1 v/v/v EC/DEC/DMC and 1% VC). FIG. 8a shows the voltage profile for a lithium-ion cell comprising a porous Si—C anode and a lithium counter electrode that was charged and discharged at a C/20 rate between a voltage range of 0.01 V to 1.0 V. This low rate was used for initial cell formation cycles and to determine the maximum available specific capacity of the anode. The porous Si—C anode delivered a discharge specific capacity of 1700 mAh/g per Si active material, which is an improvement of ~415% compared to the capacity achieved for a conventional carbon anode (330 mAh/g) evaluated at the same charge-discharge rate (FIG. 8b).

Figure 9A:
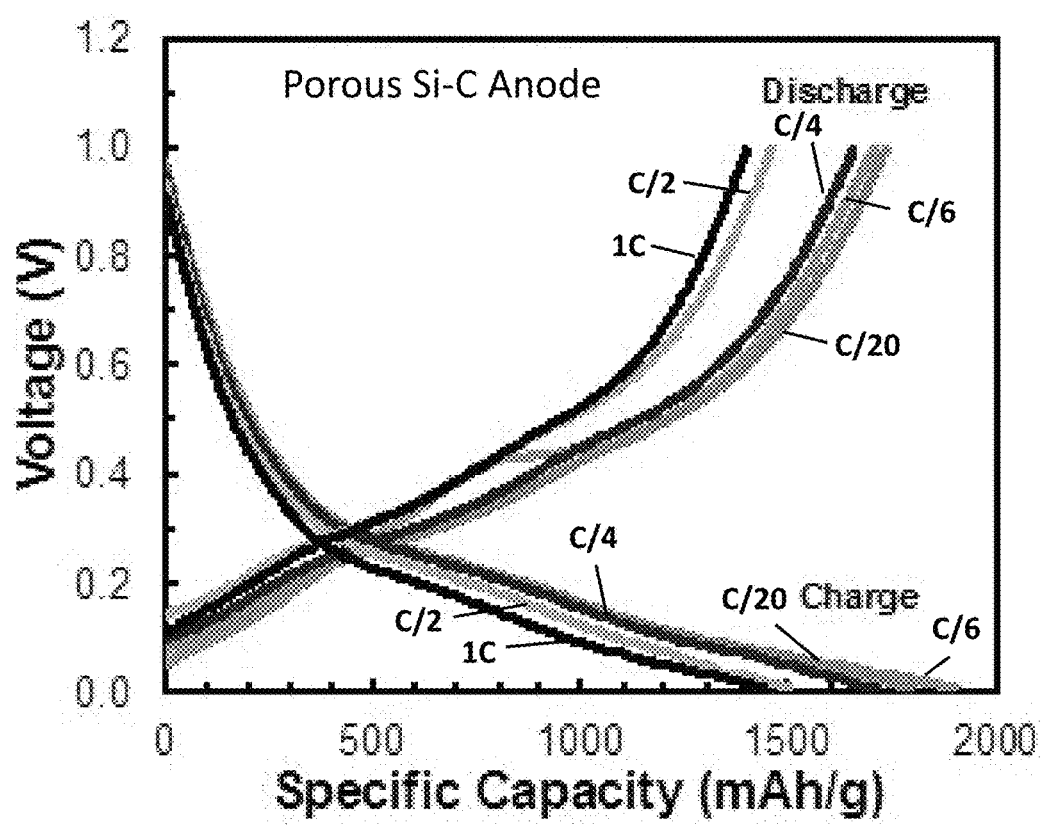
FIG. 9a is a graph of the voltage charge and discharge profiles at different charge and discharge rates using a lithium-ion cell with a porous Si—C anode according to the teachings of the present invention.
Figure 9B:
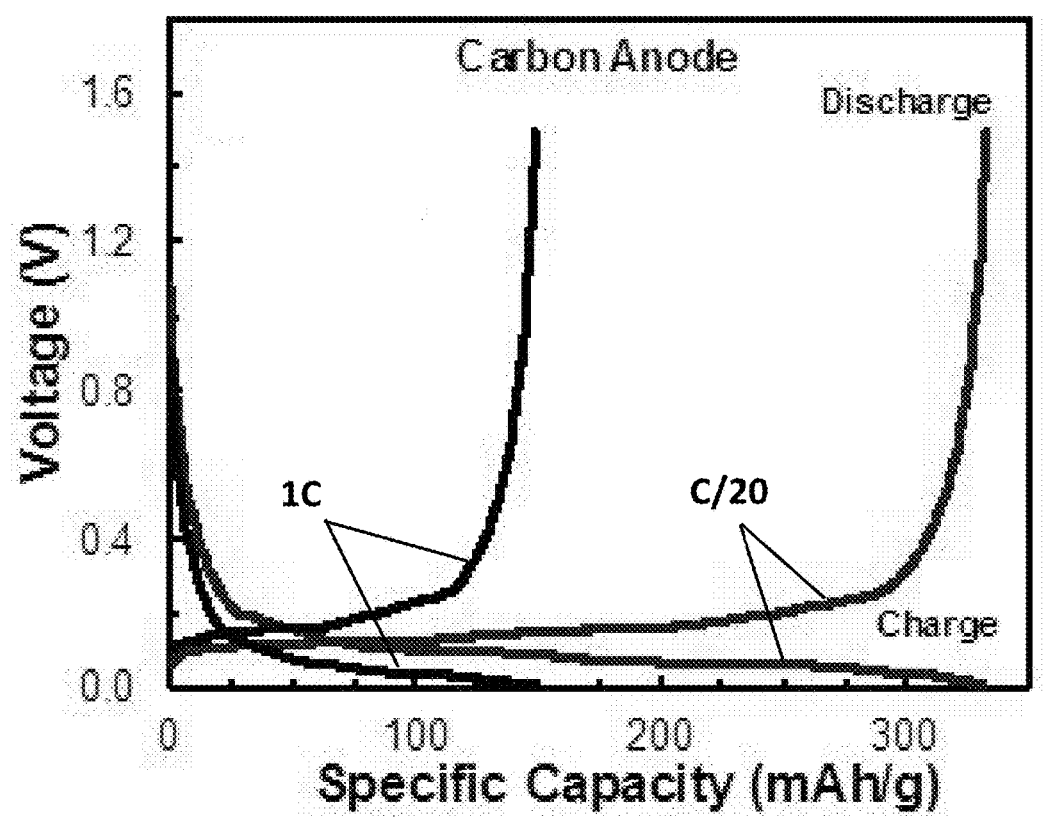
FIG. 9b is a graph of the voltage charge and discharge profiles at different charge and discharge rates using a lithium-ion cell with a conventional carbon anode according to the teachings of the present invention.

High-rate performance is an important requirement for many lithium-ion battery applications that demand fast recharge and fast discharge capability. The porous Si—C anode described in this invention possesses a unique three-dimensional pore structure that can be infiltrated with electrolyte to enable rapid access of lithium ions to the active anode material for high-rate capability. Rate capability evaluations showed that the porous Si—C anode has good potential for high-rate applications. The anode specific capacity at discharge rates of C/4, C/2, and 1 C was 1634, 1438, and 1390 mAh/g, respectively, which represents a capacity retention of 96%, 85%, and 82% compared to the low rate (C/20) discharge capacity of 1700 mAh/g (FIG. 9a). In contrast, a conventional carbon anode showed a 1 C rate discharge capacity of 149 mAh/g, which is only 45% of the capacity obtained at a C/20 rate (330 mAh/g) (FIG. 9b).

Figure 10A:
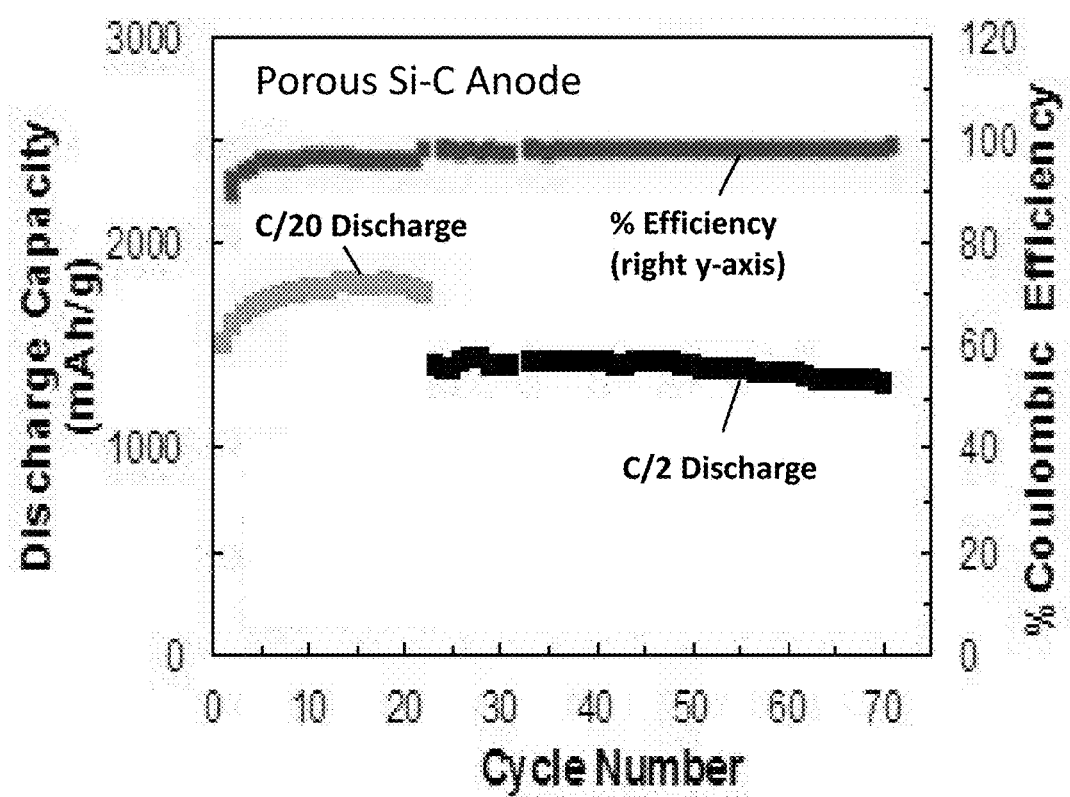
FIG. 10a is a graph of the voltage discharge profiles and % efficiency using a lithium-ion cell with a porous Si—C anode according to the teachings of the present invention.
Figure 10B:
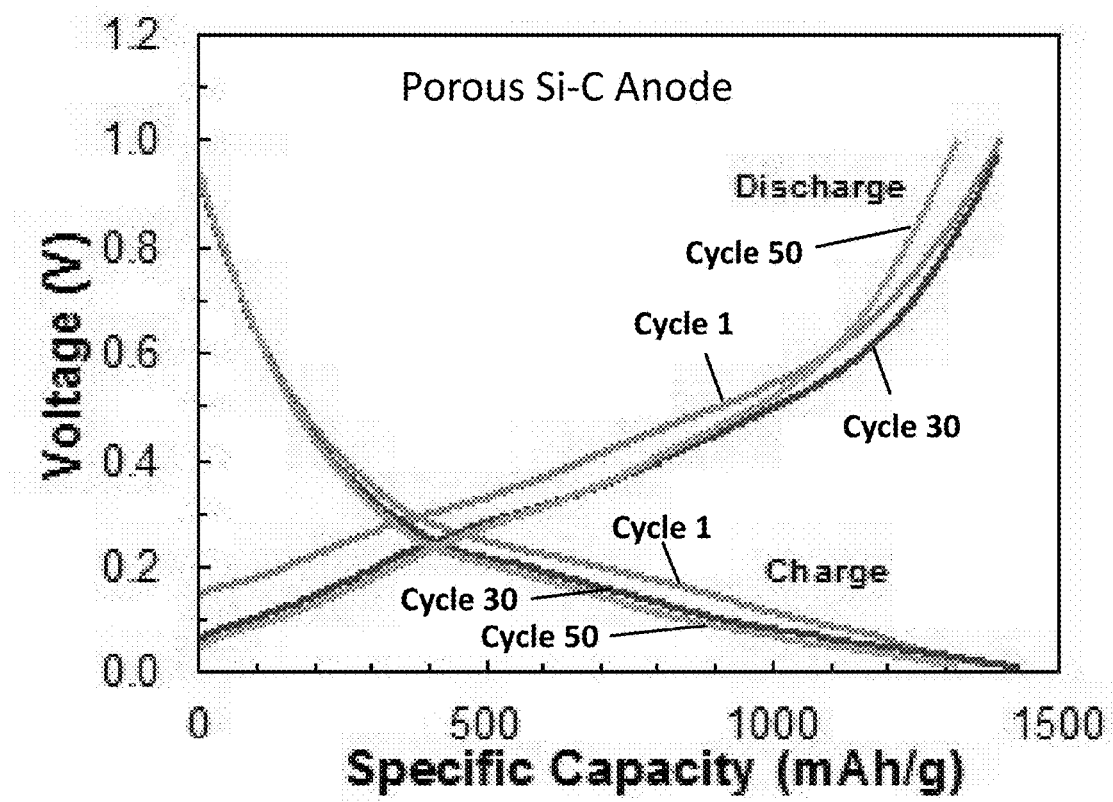
FIG. 10b is a graph of the voltage charge and discharge profiles at different cycle numbers using a lithium-ion cell with a porous Si—C anode according to the teachings of the present invention.
Figure 10C:
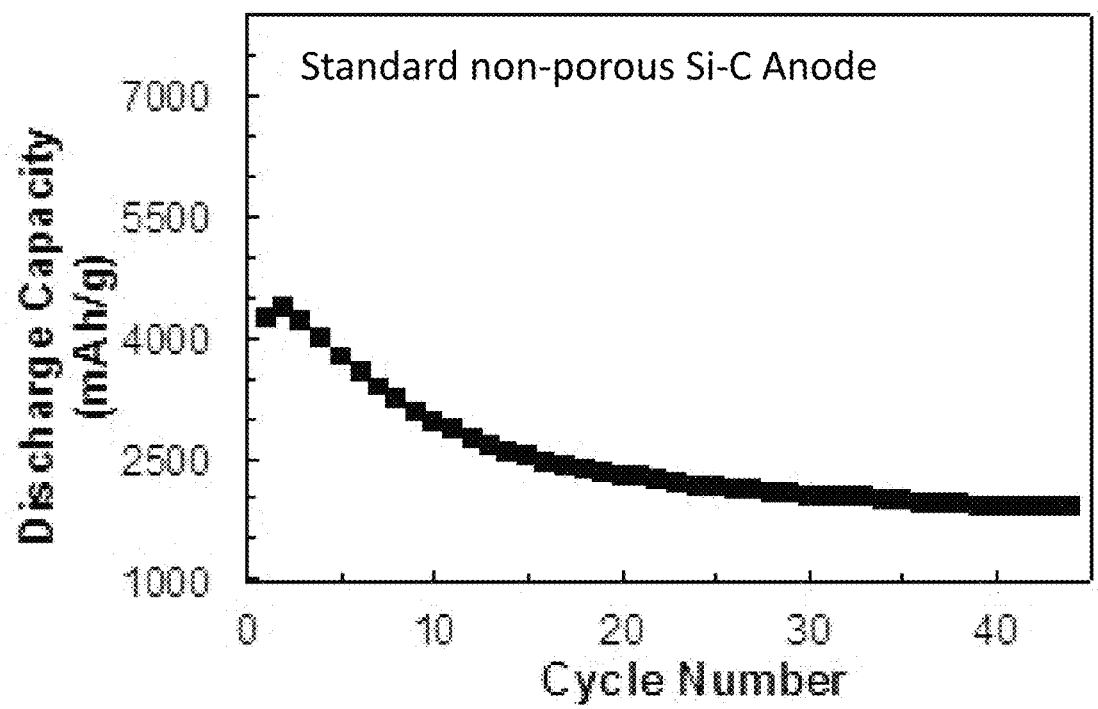
FIG. 10c is a graph of the discharge capacity profile at different cycle numbers using a lithium-ion cell with a standard non-porous Si—C anode according to the teachings of the present invention.

FIG. 10a shows the cycling results for porous Si—C anode at 100% depth-of-discharge (DOD) and C/2 and C/20 discharge rates. FIG. 10b shows the charge and discharge profiles at cycles 1, 30, and 50. The capacity retention was ~96% after 50 cycles, thus demonstrating that this anode may be developed to meet the high cycle life demands for various Li-ion battery applications. In contrast, even at a low-rate (C/20) cycling regime, the capacity of a standard non-porous Si nanoparticle anode (~25 nm in diameter), which was evaluated as a control sample, fades rapidly to 44% of its initial value after only 45 cycles (FIG. 10c).

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A porous material suitable for use in an anode, the porous material being prepared by a method comprising the steps of:
   (a) forming a bi-continuous microemulsion, the bi-continuous microemulsion comprising a polymer A, a polymer B, and a di-block polymer A-B;
   (b) solidifying the bi-continuous microemulsion to form a solid bi-continuous microemulsion;
   (c) removing either, but not both, of the polymer A or the polymer B from the solid bi-continuous microemulsion, whereby a porous template is produced;
   (d) impregnating the porous template with a mixture comprising active anode particles and a carbon-forming precursor;
   (e) treating the impregnated porous template so that the carbon-forming precursor is converted to a carbon matrix, whereby the active anode particles are embedded in the carbon matrix, and so that the polymer B and the di-block polymer A-B are eliminated, leaving voids where the polymer B and the di-block polymer A-B were previously, the voids creating an interconnected network of pores that is substantially continuous in all three dimensions.

2. A battery, the battery comprising:
   (a) an anode, the anode comprising
      (i) an anode coating, the anode coating comprising
         (A) the porous material of claim 1; and
         (B) a binder;
      (ii) a substrate, the anode coating being disposed on the substrate;
   (b) a cathode;
   (c) a separator, the separator positioned between the anode and the cathode; and
   (d) an electrolyte.

3. The battery as claimed in claim 2 wherein at least one of polymer A and polymer B is selected from the group consisting of polyisoprene (PI), polystyrene (PS), polyethylene (PE), poly(ethylene-alt-propylene) (PEP), poly(ethylene oxide) (PEO), polypropylene (PP), polyethylethylene (PEE), poly(dimethylsiloxane) (PDMS), poly(methylmethacrylate) (PMMA), and poly(L-lactide) (PLLA).

4. The battery as claimed in claim 2 wherein the di-block polymer A-B is selected from the group consisting of polystyrene-block-polyisoprene (PS-PI), poly(ethylene-block-ethylene-alt-propylene) (PE-PEP), polyethylethylene-block-poly(dimethylsiloxane) (PEE-PDMS), polyethylene-block-poly(ethylene oxide) (PE-PEO), polystyrene-block-poly(methylmethacrylate) (PS-PMMA), poly styrene-block-poly(ethylene oxide) (PS-PEO), and poly styrene-block-poly(L-lactide) (PS-PLLA).

5. The battery as claimed in claim 2 wherein the bi-continuous microemulsion comprises about 45% polymer A by volume, about 45% polymer B by volume, and about 10% di-block polymer A-B by volume.

6. The battery as claimed in claim 2 wherein the active anode particles are made of at least one material selected from the group consisting of carbon-coated silicon, silicon-coated carbon, carbon doped with silicon, silicon doped with carbon, alloys of carbon and silicon, germanium, germanium oxide, carbon-coated germanium, germanium-coated carbon, carbon doped with germanium, germanium doped with carbon, alloys of carbon and germanium, tin, tin oxide, carbon-coated tin, tin-coated carbon, carbon doped with tin, tin doped with carbon, tin-silicon alloy, indium, antimony, bismuth, lead, and lead oxide.

7. The battery as claimed in claim 2 wherein the active anode particles have a particle size of about 0.005 to 30 μm.

8. The battery as claimed in claim 7 wherein the active anode particles have a particle size of about 0.005 to 0.5 μm.

9. The battery as claimed in claim 2 wherein the carbon-forming precursor is at least one member selected from the group consisting of polyacrylonitrile, phenolic resins, carbohydrate materials, petroleum and coal tar pitches.

10. The battery as claimed in claim 2 wherein said treating step comprises pyrolysis.

11. The battery as claimed in claim 2 wherein the carbon matrix comprises at least one of amorphous carbon and crystalline carbon.

12. An anode coating, the anode coating comprising:
    (a) the porous material of claim 1; and
    (b) a binder.

13. The battery of claim 2 wherein the binder is at least one member selected from the group consisting of carboxymethyl cellulose ("CMC"), CMC in combination with styrene-butadiene copolymer (SBR), -poly(acrylic acid) (PAA), acrylonitrile-butadiene copolymer latex, polyacrylamide in combination with carboxylated styrene-butadiene copolymer, polyacrylamide in combination with carboxylated styrene-acrylate copolymer, poly(tetrafluoroethylene) (PTFE), poly(vinylidene fluoride) (PVDF), poly(vinylidene fluoride-co-hexafluoropropylene), styrene-butadiene copolymer (SBR), acrylonitrile-butadiene copolymer (NBR), carboxymethyl cellulose (CMC), polyacrylic, polyethylene oxide, polyimide, poly(vinyl pyrrolidone) (PVP), polyurethanes and polyamides.

14. The battery of claim 2 further comprising an electrically-conductive additive.

15. The battery of claim 14 wherein the electrically-conductive additive is at least one member selected from the group consisting of carbon black, acetylene black, natural and synthetic graphite, coke, Ketchen black, channel black, furnace black, lamp black, carbon fiber, graphene sheets, single-, double-, and multi-walled carbon nanotubes, metallic particles, conductive metal oxides, and electronically conductive polymers.

16. The battery of claim 14 wherein the electrically-conductive additive may have at least one shape selected from the group consisting of spheres, rods, ellipsoids, bead-like strings, plates, sheets, and branched structures.

17. The battery of claim 14 wherein the electrically-conductive additive has one or more of length, width, height, thickness, and diameter ranges of about 0.001 to 30 μm.

18. The battery of claim 14 wherein the porous material constitutes about 20-92%, by weight, of the anode coating, wherein the binder constitutes 2-25%, by weight, of the anode coating, and wherein the electrically-conductive additive constitutes about 0.1-70%, by weight, of the anode coating.

19. An anode, the anode comprising:
(a) the anode coating of claim 12; and
(b) a substrate, the anode coating being disposed on the substrate.

20. The battery of claim 2 wherein the anode coating has a thickness of about 10 to 1000 µm.

21. The battery of claim 2 wherein the anode coating has a thickness of about 10 to 100 µm.

22. The battery of claim 2 wherein the anode coating has a porosity range of about 40-70% by volume.

23. The battery of claim 2 wherein the substrate is at least one material selected from the group consisting of copper, copper alloy, aluminum, stainless steel, titanium, nickel, nickel alloy, chromium, tungsten, metal nitrides, metal carbides, metal oxides, carbon, carbon fiber, graphite, graphene, and conductive polymers.

24. The battery of claim 2 wherein the substrate has a structure selected from the group consisting of a film, mesh, perforated sheet, foam, wires, laminates, tubes, particles, or multi-layer structures.

25. The battery of claim 2 wherein the substrate has a thickness of about 1 to 50 µm.

26. The battery as claimed in claim 2 wherein the battery is a lithium-ion battery.

27. The battery as claimed in claim 2 wherein the cathode comprises a cathode coating and a cathode substrate, the cathode coating being applied to the cathode substrate.

28. The battery as claimed in claim 27 wherein the cathode coating further comprises a conductive additive and a binder.

29. The battery as claimed in claim 2 wherein the electrolyte is selected from the group consisting of a liquid electrolyte, a solid electrolyte, and a gel electrolyte.

* * * * *